June 13, 1944.   F. A. KRUSEMARK   2,351,054
VALVE FOR SAFETY INNER TUBES AND THE LIKE
Filed Aug. 7, 1940
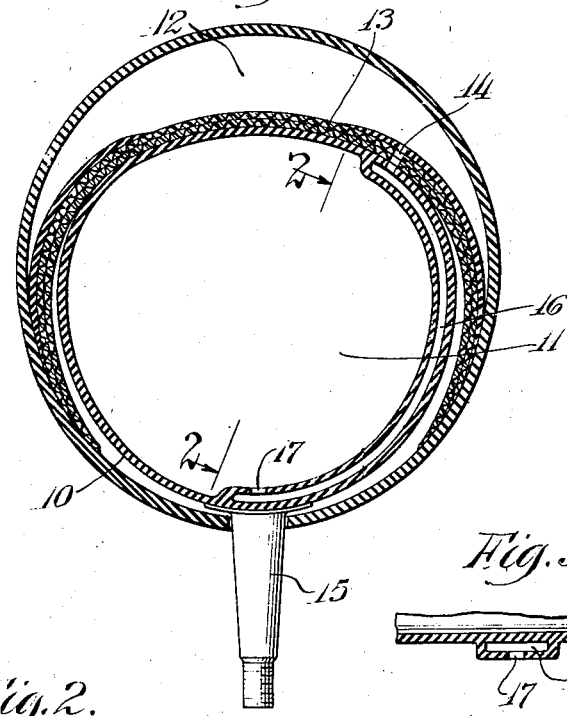
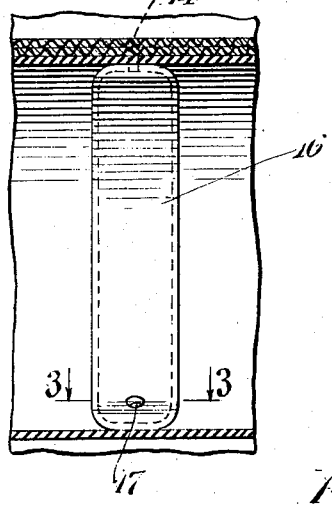
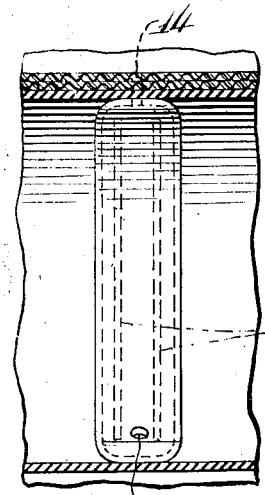
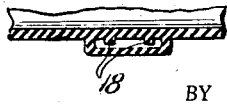
INVENTOR.
Frederick A. Krusemark
BY
Attorney.

Patented June 13, 1944

2,351,054

UNITED STATES PATENT OFFICE 2,351,054

VALVE FOR SAFETY INNER TUBES AND THE LIKE

Frederick A. Krusemark, Chicago, Ill., assignor to The Mansfield Tire and Rubber Company, Mansfield, Ohio, a corporation of Ohio Application August 7, 1940, Serial No. 351,714

5 Claims. (Cl. 152—342)

This invention has to do with valves used in inflating the multiple chambers of a safety inner tube or the like.

In inflating inner tubes having multiple air chambers, it is necessary on the popular brands on the market today to force the air into one chamber, which I designate as inner air chamber, and provide an opening or port from the inner air chamber into each of the other air chambers. In past constructions, it is generally (although there are exceptions) necessary to provide a restricted opening between the two air chambers, with a metal grommet or other means for maintaining the restriction.

For the reason that it is desirable to limit the flow of air from the inner chamber to each of the outer chambers when there is a failure of an outer chamber and loss of air therefrom caused by a blowout or similar accident, the opening between the inner air chamber and the outer air chambers has heretofore been very restricted, and air has only been permitted to pass slowly from the inner air chamber to the outer air chamber. Upon inflation at a service station, where such an arrangement is present, the pressure in the inner air chamber is rapidly built up to that desired or more, and the outer air chamber does not have the pressure rapidly built up therein and consequently there is considerable differential for a considerable period of time. As a result, it is difficult to regulate the amount of air pressure in the tube and this is particularly true if time does not permit the operator to let the vehicle stand until the pressure in all air chambers is equalized. This differential in pressure which is usually present is very objectionable and may result among other things, in tire failure or in rough riding of the vehicle upon which the inner tube is mounted.

It is the object of the present invention to provide a means wherein the inner air chamber and the outer air chamber are inflated under rapidly equalizing arrangement, so that there is no appreciable wait before a testing of the air pressure by applying a gauge to the inflation valve indicates the correct air pressure in the inner tube.

It is a further object of the present invention to provide a means whereby some air is conducted directly into the outer air chamber (I will hereafter refer to the air chambers other than the inner air chamber as being outer air chamber whether one or a plurality of such chambers is present) without entering the inner air chamber, at the same time and from the same inlet valve as I use to inflate the inner air chamber.

It is the further object of the present invention to provide a valve arrangement which equalizes the air between the two chambers under normal operating conditions but which will restrict the flow from the inner air chamber to the outer air chamber when there is a failure of the outer air chamber.

A further object of the present invention is to provide a valve means which is easily built into the tube when the tube is manufactured, is preferably comprised of materials readily available at a tire factory, and in fact which may be identical with the materials used in the construction of the tube or of tires generally. It is the further object to provide a construction which is relatively simple, is inexpensive, and which will operate satisfactorily under ordinary conditions of usage normally necessary for such types of inner tubes.

Another object of this invention is to provide a structure which may be readily deflated for removal from a rim or for other reasons. In this connection, the majority if not all of the safety tubes now on the market are difficult to deflate, particularly where there is a slow leak or it is necessary to remove the tire for some reason from the car.

It is an object of this invention to provide a valve which readily transmits the pressure from an outer air chamber upon deflation of the inner air chamber upon removal of the closure in the inlet valve of a tube, so that the tube is rapidly deflated on such occasion.

Other objects and advantages of the invention will appear as the nature of the improvements is better understood, the invention consisting substantially in the novel construction, combination and arrangement of parts hereinafter fully described, illustrated in the accompanying drawing, and finally pointed out in the appended claims.

In the drawing—

Figure 1 is a cross sectional view through one type of safety inner tube showing one embodiment of my invention;

Figure 2 is a fragmentary longitudinal sectional view taken on the line 2—2 of Figure 1, looking in the direction of the arrows;

Figure 3 is a fragmentary sectional view taken on the line 3—3 of Figure 2, looking in the direction of the arrows;

Figure 4 is a view similar to Figure 3, illustrating a modification of my invention; and Figure 5 is a view similar to Figure 3, but illustrating the modification of Figure 4.

Referring more in detail to the construction shown in the various figures, and particularly to Figure 1, I have provided the safety tube 10 having the inner air chamber 11 and the outer air chamber 12, the two air chambers being separated by a wall structure hereinafter referred to as wall 13.

Passing through the wall 13 is a port 14 through which the outer air chamber is inflated.

Preferably attached to the structure of the inner air chamber I have provided the inlet valve 15 which is the standard valve on the market today insofar as its construction is concerned.

Within the inner tube air chamber 11, and in position so that one end is over the inlet end of the inlet valve, I have provided a strip of material preferably made of rubber, rubberized fabric or other similar materials.

This strip of material extends over the end of the inlet valve so that it is between the inlet port of the inlet valve and the chamber 11. The strip of material extends to the port 14 in the wall 13. This strip of material is preferably stitched or otherwise fastened to the wall structure of the inner air chamber 11, so that it forms a conduit between the inlet valve and the port 14. The arrangement will be hereafter referred to as the conduit 16.

It will be noted that the conduit 16 as shown in Figures 1 and 2 and in Figure 3 in detail, is a completely closed unit except for the port 14 and the hole 17, which hole 17 forms a passage from the interior of the conduit 16 into the inner air chamber, and with the further exception of the inlet valve opening (not shown) communicating with the interior of the conduit 16.

Preferably the hole 17 is located at or near the inlet valve 15, and has, preferably, a smaller diameter than the opening of the inlet valve 15. It is desirable although not absolutely necessary that the hole 17 and the port 14 have a combined opening substantially equivalent to that of the opening in the inlet valve 15 to which air is admitted to the inner air chamber and the outer air chamber.

It is entirely feasible to place the opening 17 anywhere along the conduit 16, although it is not believed desirable to place it directly over the port 14.

It will thus be seen that when air is forced through the valve 15 into the inner tube, a portion at least of said air will go through the hole 17 into the inner air chamber, and another portion of said air will be trapped in said conduit 16, and carried to the port 14 where it goes into the outer air chamber. If the hole 17 is smaller than the inlet port in the inlet valve 15, some air from said inlet valve must necessarily go along the conduit 16 and cannot be stopped because of collapse of said conduit. In all probability the direction of the flow of the air and the normal expansion of the air after being confined in the inlet valve would cause the conduit 16 to carry a portion of the air to the outer air chamber whether or not the hole 17 is as large as the opening in the inlet valve.

Upon failure of the outer air chamber because of a blow-out or otherwise, the conduit 16 has a tendency to collapse and either entirely seal the opening 14 or restrict the flow of air from the inner air chamber through said opening 14. Until such failure of the outer air chamber however, there should be no collapse of the conduit 16 in normal operation when the vehicle on which the tube is mounted is standing still. Under such circumstances the air or gas in the chamber 11 will be equalized with that of the air in chamber 12 by means of the hole 17.

If it is desired to deflate the inner tube for some reason, upon opening the valve in the inlet valve 15, pressure in the two air chambers will cause the gas to flow through the port 14 and hole 17 and the inner tube will be rapidly deflated.

While I have described the conduit 16 in terms of the strip of material, it is understood that it relates to the arrangement whereby gas is transmitted through a channel formed by the strip of material. In all probability the conduit 16 will have sufficient tensile strength from the materials of which it is made to enable it to hold up against a complete collapse even upon failure of the outer air chamber, so that there is a slow flow of gas from said inner chamber to said outer air chamber even on failure of the latter, resulting in letting the tire down gradually as in a slow leak. This is a matter of manufacturing design however.

In order to present a structure which will insure some communication between the inner and outer air chamber at all times and under all conditions of operation, I have provided the modification shown in Figures 4 and 5 consisting of a bead or beads, preferably running lengthwise of said conduit 16, and which hold a portion of said conduit away from the wall of the tube so that air may always flow along said conduit from the inner air chamber through the hole 17, or vice versa, as the case may be. It is understood that the bead 18 may be in the form of a single bead on the strip forming the conduit running from approximately the hole 17, and may be attached to the strip of material or to the side of the tube wall as desired, or merely be a wire or object placed in the channel of the conduit.

As a matter of fact, the conduit would work perfectly well and is intended hereby to apply to use of a structure in the form of a tube from the inlet valve to the port 14, provided said tube is built with the hole 17 or its equivalent. It is not considered as necessary to illustrate such a tube because from the description it should be clear that it could be substituted for the conduit 16 although it would not be so desirable for various apparent reasons.

The form of the invention herein shown and described presents a preferred embodiment thereof, and delineates its adaption to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. Inflating means for a safety tube and the like having inner and outer air chambers, means separating said air chambers comprising a wall or the like with a port therein, means for introducing air into said chambers, such means comprising an inlet valve or the like, collapsible conduit means from said inlet valve to said port, said conduit means comprising a strip of rubber material with its edge portions attached to the wall separating the air chambers, on the inner air chamber side of said wall, said strip of rubber material overlying both the inlet valve and the port a bead means in said conduit, maintaining the conduit against total collapse from a position adjacent to the valve to the hereinafter mentioned opening and port in said conduit, and maintaining communication for the flow of air from one chamber to the other, a hole in said conduit means communicating with one of said air chambers, said hole being of restricted size as compared to the inlet opening from said inlet valve whereby some of the air from said inlet valve in normal inflation operations will be forced through said conduit and port, and the remainder of said air will be forced into the air chamber with which said hole in said conduit communicates said collapsible conduit being normally open and subject to collapse upon a reduction of pressure within the conduit and outer air chamber.

2. Inflating means for a safety tube and the like having inner and outer air chambers, means separating said air chambers comprising a wall or the like with a port therein, means for introducing air into said chambers, such means comprising an inlet valve or the like, collapsible conduit means from said inlet valve to said port, said conduit means comprising a strip of rubber or the like material attached all around its edge portions to the inner air chamber side of the wall between the air chambers, and extending over said inlet valve and port, and forming a conduit therebetween, a hole in said conduit means communicating with one of said air chambers, said hole being of restricted size as compared to the inlet opening from said inlet valve whereby some of the air from said inlet valve in normal inflation operations will be forced through said conduit and port, and the remainder of said air will be forced into the air chamber with which said hole in said conduit communicates said collapsible conduit being normally open and subject to collapse upon a reduction of pressure within the conduit and outer air chamber.

3. A safety inner tube comprising an inner air chamber and an outer air chamber and an intervening wall therebetween, an air inlet for said inner air chamber, an aperture in said intervening wall, and valvular means connecting said aperture to said inlet, said valvular means comprising a tubular normally open collapsible conduit exposed exteriorly to air pressure within said inner air chamber and collapsible upon a reduction of pressure within the conduit and said outer air chamber upon failure thereof.

4. A safety inner tube comprising an inner air chamber and an outer air chamber and an intervening wall therebetween, an air inlet for said inner air chamber, an aperture in said intervening wall, and valvular means connecting said aperture to said inlet, said valvular means comprising a tubular normally open flat cross sectioned collapsible conduit formed in part by said intervening wall and having a portion thereof exposed exteriorly to air pressure within said inner air chamber whereby collapse of said conduit is effected upon loss of pressure within the conduit and said outer chamber thereof.

5. A safety inner tube comprising an inner air chamber and an outer air chamber and an intervening wall therebetween, an air inlet for said inner air chamber, an aperture in said intervening wall, and valvular means connecting said aperture to said inlet, said valvular means comprising a tubular normally flat cross sectioned collapsible conduit formed in part by said intervening wall and having a portion thereof exposed exteriorly to air pressure within said inner air chamber, means for limiting the collapse of said tube to restrict the passage in response to pressure upon said exteriorly exposed portion when pressure within the tube and the outer air chamber falls through failure of the outer air chamber.

FREDERICK A. KRUSEMARK.